United States Patent [19]
Takayama et al.

[11] Patent Number: 5,424,774
[45] Date of Patent: Jun. 13, 1995

[54] IMAGE SENSING APPARATUS

[75] Inventors: Tsutomu Takayama, Kanagawa; Yasuyuki Yamazaki, Saitama, both of Japan

[73] Assignee: Canon Kabushiki Kaisha, Tokyo, Japan

[21] Appl. No.: 157,392

[22] Filed: Nov. 23, 1993

Related U.S. Application Data

[63] Continuation of Ser. No. 692,670, Apr. 29, 1991, abandoned.

[30] Foreign Application Priority Data

| May 2, 1990 | [JP] | Japan | 2-115167 |
| May 2, 1990 | [JP] | Japan | 2-115168 |
| Jul. 3, 1990 | [JP] | Japan | 2-174487 |

[51] Int. Cl.$^6$ ............... H04N 5/228; H04N 9/73
[52] U.S. Cl. ............... 348/222; 348/223; 348/257; 348/97; 348/692
[58] Field of Search ............... 348/222, 223, 224, 225, 348/227, 229, 228, 230, 241, 242, 243, 244, 254, 255, 256, 257, 258, 96, 97, 98, 99, 100, 101, 102, 104, 105, 689, 691, 692, 695, 696, 697; H04N 9/11, 3/36, 5/253, 5/228, 9/73

[56] References Cited

U.S. PATENT DOCUMENTS

| 4,635,101 | 1/1987 | Nakayama | 358/76 |
| 4,642,700 | 2/1987 | Ohta et al. | 358/54 |
| 4,651,226 | 3/1987 | Motoori et al. | 358/497 |
| 4,703,360 | 10/1987 | Shor | 358/54 |
| 4,729,026 | 3/1988 | Suzuki et al. | 358/172 |
| 4,866,513 | 9/1989 | Takahashi | 358/76 |
| 5,019,909 | 5/1991 | Sawachi | 358/32 |

Primary Examiner—James J. Groody
Assistant Examiner—Michael H. Lee
Attorney, Agent, or Firm—Robin, Blecker, Daley & Driscoll

[57] ABSTRACT

An image sensing apparatus includes an image sensing circuit, an inverting circuit for inverting a polarity of an output of the image sensing circuit, and a correcting circuit for correcting a black reference level of the output of the image sensing circuit in accordance with an operation of the inversion circuit.

22 Claims, 14 Drawing Sheets

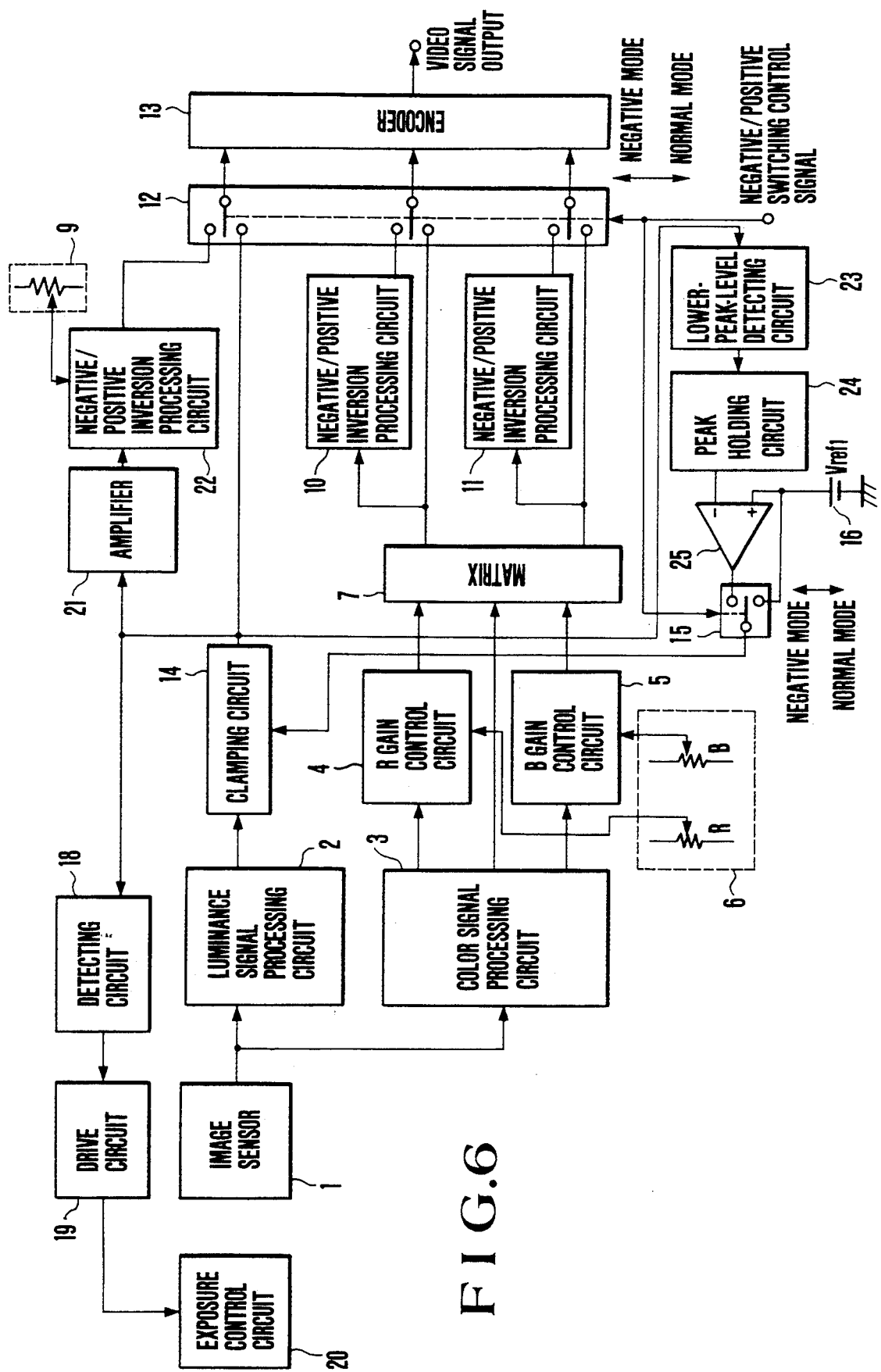
F I G. 6

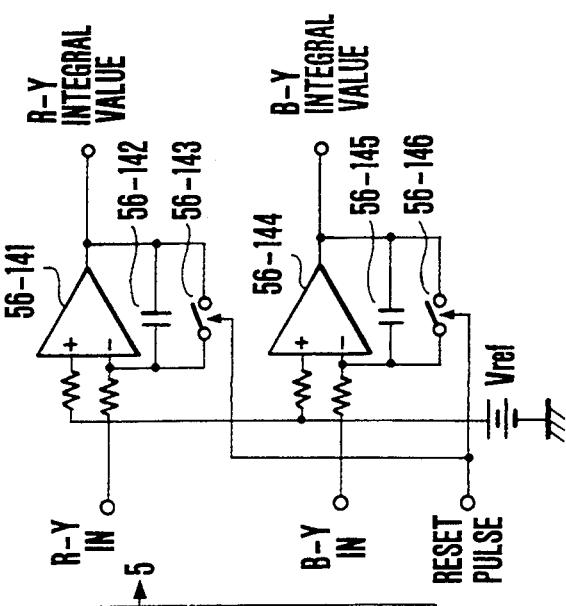
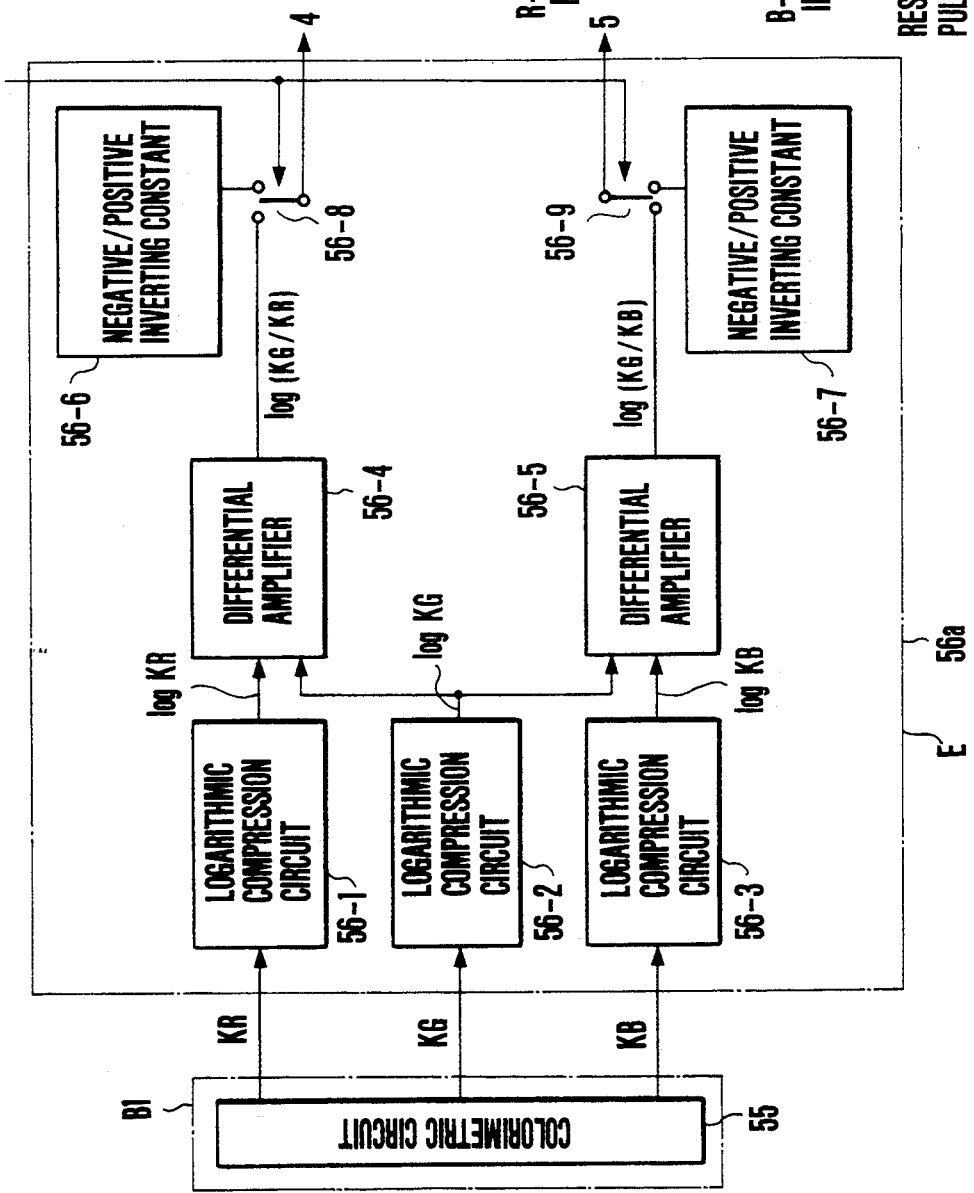

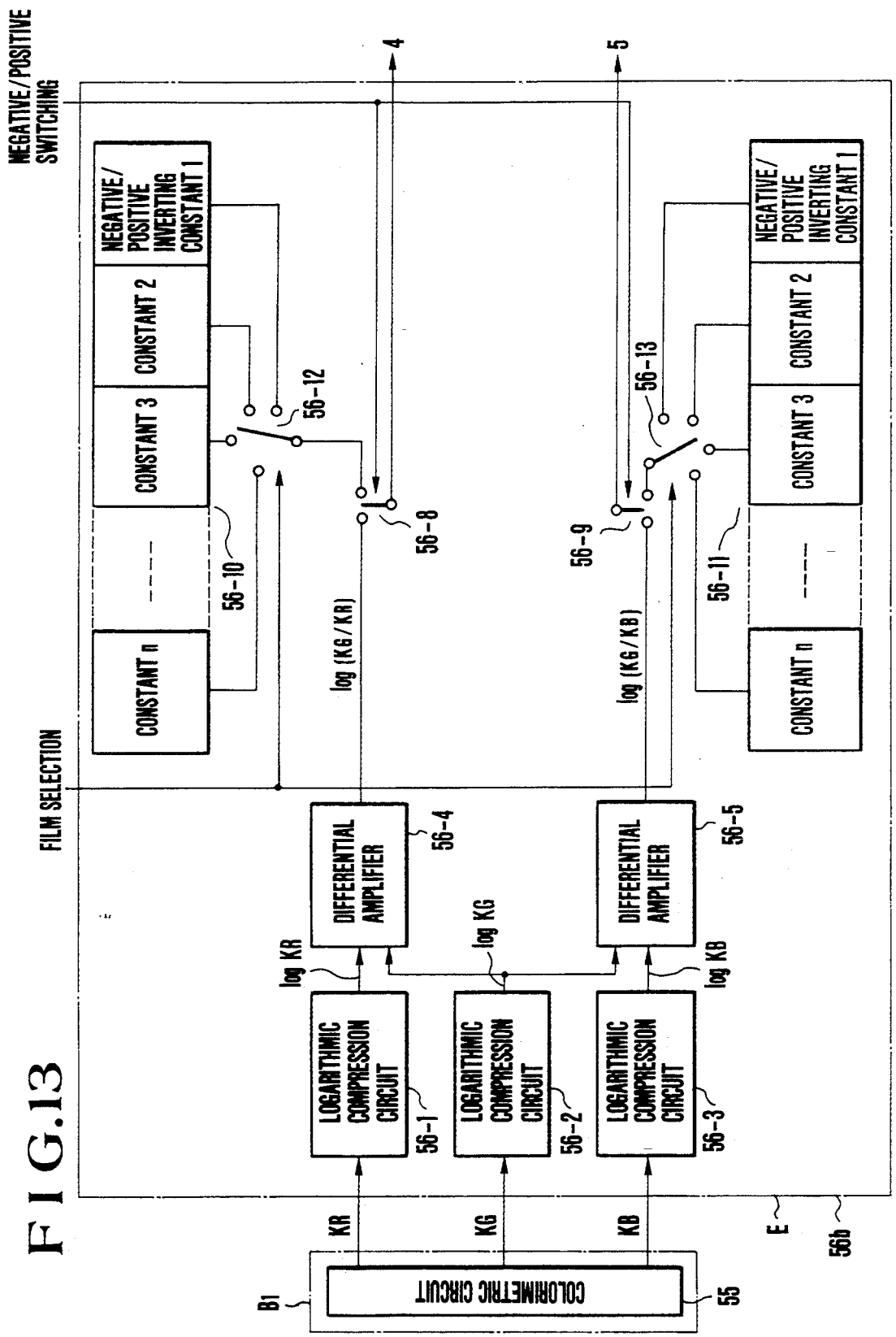

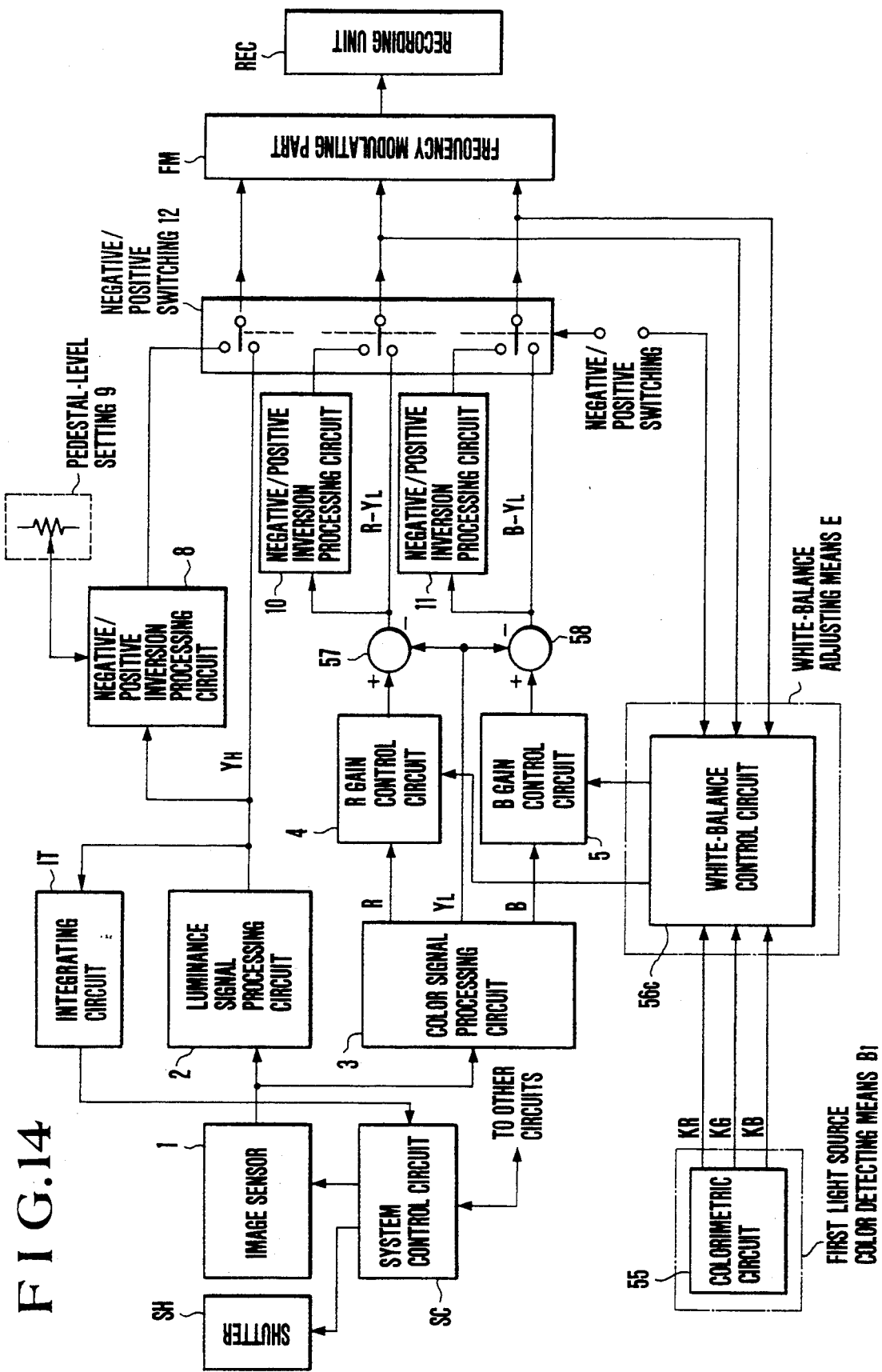

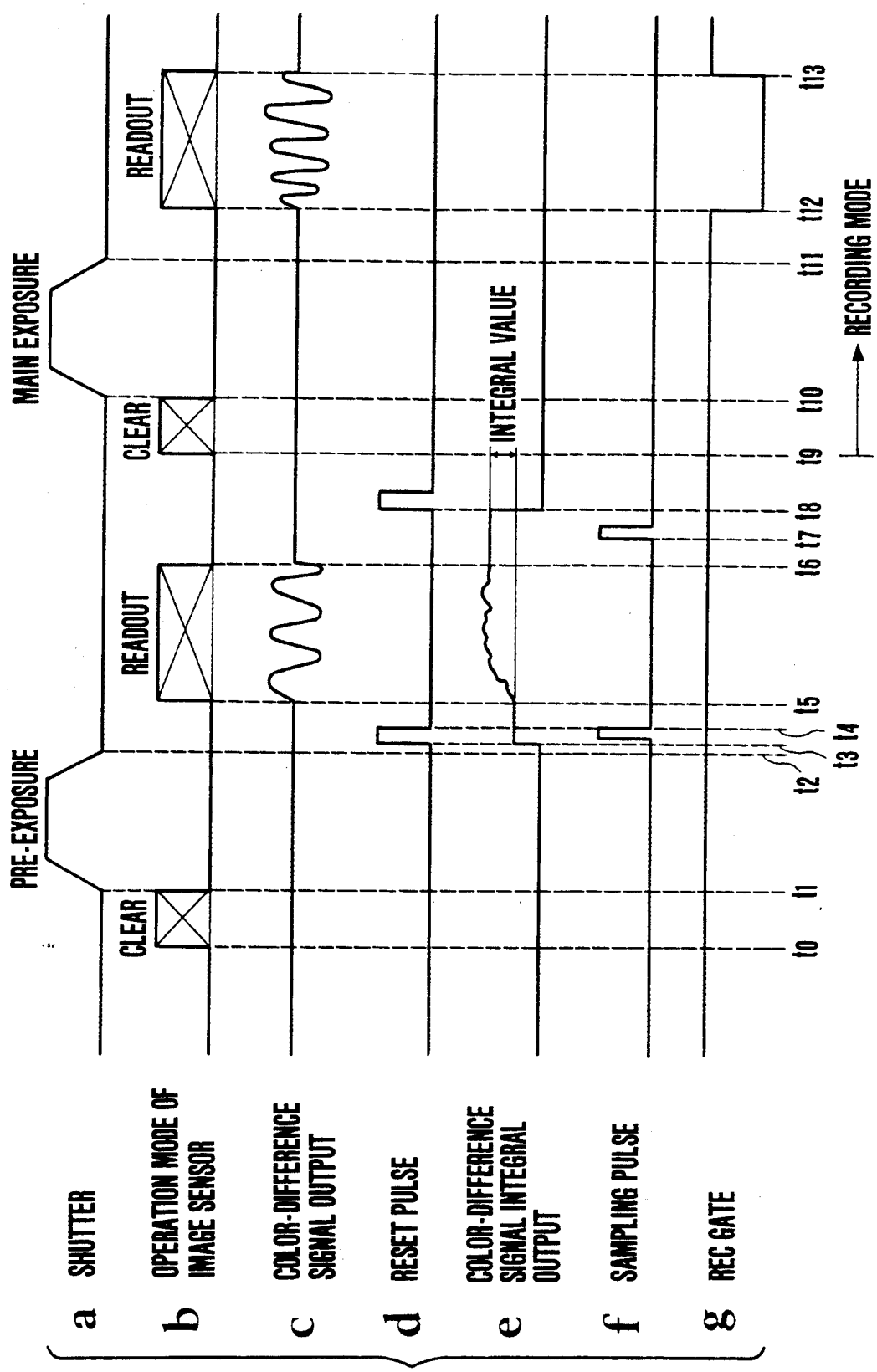

IMAGE SENSING APPARATUS

This is a continuation of prior application Ser. No. 692,670, filed Apr. 29, 1991, now abandoned.

BACKGROUND OF THE INVENTION

1. Field of the Invention

The present invention relates to an image sensing apparatus including polarity inverting means for inverting the polarity of a sensed image.

2. Description of the Related Art

Referring to FIG. 1 which is a block diagram showing a conventional image sensing apparatus, the apparatus includes an image sensor 1 for converting an optical image of a subject or a negative image formed on a negative film into an electrical signal, a luminance signal processing circuit 2 for processing an output signal from the image sensor 1 and producing a luminance signal $Y_H$, and a color signal processing circuit 3 for producing RGB signals.

The conventional image sensing apparatus also includes gain control circuits 4 and 5 for white-balance control of the respective R and B signals, a potentiometer part 6 for white-balance control which includes potentiometers independently provided for the R and B signals, a matrix circuit 7 for producing color-difference signals R-YL and B-YL, a negative/positive inversion processing circuit 8 for the luminance signal which includes circuit elements such as an inverting circuit and a blanking processing circuit for setting a pedestal level, a potentiometer 9 for setting the pedestal level, negative/positive inversion processing circuits 10 and 11 for the color-difference signals, each of which includes an inverting circuit and so on, a switching circuit 12 which is switched in accordance with a negative/positive switching control signal, and an encoder circuit 13 for generating a composite video signal from the luminance signal and the color-difference signals.

FIG. 2 is a graph showing the characteristics of densities D of individual developed photosensitive layers with respect to a typical exposure amount log H which is given to a color negative film during photography. If the negative film is illuminated with an appropriate light source having good color rendering and transmitted light is sensed by the image sensing apparatus for negative/positive inversion having the above-described arrangement, signal levels equivalent to the $R_0$, $G_0$ and $B_0$ shown in FIG. 2 are obtained from the respective RGB outputs of the color signal processing circuit 3 with respect to the film exposed by, for example, a particular exposure amount $E_0$. From the luminance signal processing circuit 2, a luminance signal equivalent to $Y_0 = 0.3R_0 + 0.59G_0 + 0.11B_0$ is also obtained.

As a matter of course, the signal levels of the above-described color and luminance signals are proportional to the quantity of light incident on the image sensor 1. FIG. 3 is a graph showing the relation between the exposure amount log H which is given to the film during photography and the relative value of a luminance signal level if the quantity of light incident on the image sensor 1 is set to a predetermined value, a luminance signal level obtained at the base portion of the film being set to 100%. If a maximum exposure amount, an average exposure amount and a minimum exposure amount are, for example, $E_0$, $E_1$ and $E_2$ for the film, corresponding luminance signal levels are $V_{E0}$, $V_{E1}$ and $V_{E2}$. In the conventional example, the quantity of light incident on the image sensor 1 has been adjusted so that $V_{E2}$ reaches 100% or $V_{E1}$ reaches a predetermined proper value (for example, 50%).

However, since each of the signal levels $V_{E2}$ and $V_{E1}$ equivalent to the minimum and average exposure amounts for the film contains the signal level $V_{E0}$ equivalent to the maximum exposure amount, the conventional example shown in FIG. 1 has a number of disadvantages.

(i) A large error may occur if the signal level equivalent to the average exposure amount and the signal level $V_{E2}$ equivalent to the minimum exposure amount are used as they stand, for the purpose of controlling an exposure amount which is given to the image sensor.

(ii) Even if the luminance signal is inverted to set its black level to a portion equivalent to the minimum exposure amount, a portion equivalent to the maximum exposure amount does not reach 100% and becomes small by an amount equivalent to the signal level $V_{E0}$.

Also, in the conventional example shown in FIG. 1, since a signal level proportional to the density of the negative film is obtained, the signal levels of RGB outputs with respect to a saturation exposure density level, that is, the black level of the image-sensor output, are not equal even if all the photosensitive layers are uniformly exposed. Accordingly, if the signal levels of R and B signals are to be made equal by adjusting a white-balance control circuit and controlling the gains of the R and B signals of a color signal obtained by sensing the portion of the film which has been exposed by, for example, the exposure amount $E_0$ during photography, a deviation in white balance becomes extremely large at a portion of low density, that is, a portion corresponding to relatively high RGB signal levels.

In addition, if a negative/positive inverting device such as the conventional example is to be applied to an image sensing apparatus, the following problems will arise.

(i) The conventional example is arranged so that white-balance adjustment is performed by operating the potentiometer part 6 for control of white balance while an image subjected to negative/positive inversion is being viewed. However, in the case of an electronic still camera having no electronic viewfinder, it is impossible to perform white-balance adjustment while viewing an image.

(ii) In the case of white-balance adjustment using an external metering method utilizing a colorimetric sensor, the colorimetric sensor is used to obtain the proportion of an R (red) component to a G (green) component to a B (blue) component which are contained in source light, and the gain control circuits 4 and 5 perform gain control on the basis of the obtained proportion. As a result, a deviation in white balance will occur if white-balance adjustment during a negative/positive inversion mode is performed on the basis of the proportion of the R component to the G component to the B component which are contained in the source light.

The reason why the deviation in white balance occurs is that since the base of a negative film, which is generally called an orange base, is orange in color, gain control for white-balance adjustment during the negative/positive inversion mode must be performed so as to make uniform the proportion of the R component to the component G to the B component which are contained in source light transmitted through a white portion of a subject recorded on the orange negative film.

SUMMARY OF THE INVENTION

It is, therefore, an object of the present invention to solve the above-described problems.

Another object of the present invention is to provide an image sensing apparatus having an inverting function which makes it possible to provide correct exposure control over an image sensor.

To achieve the above-described objects, according to a first aspect of the present invention, there is provided an image sensing apparatus including image sensing means, inverting means for inverting a polarity of an output of the image sensing means, and correcting means for correcting a black reference level of the output of the image sensing means in accordance with an operation of the inverting means.

In accordance with the first aspect of the present invention having the above-described arrangement, it is possible to obtain an optimum black reference level for either of inverted polarity and non-inverted polarity. In addition, since exposure control and the like can be performed by using an output signal of corrected black reference level, it is possible to correctly control an exposure amount, a dynamic range and the like.

Another object of the present invention is to provide an image sensing apparatus having inversion processing means which makes it possible to highly accurately adjust white balance for any density area of a negative film.

To achieve the above object, in accordance with a second aspect of the present invention, there is provided an image sensing apparatus including color image sensing means for converting an optical image into an electrical signal and generating a plurality of color signals, inversion processing means for inverting colors carried by the plurality of color signals, respectively, and black-level shifting means for shifting black levels of the respective color signals by a predetermined amount in accordance with an operation of the inversion processing means.

In accordance with the second aspect of the present invention having the above-described arrangement, the black levels of the plurality of color signals are shifted by the black-level shifting means during the operation of the inversion processing means.

Accordingly, it is possible to highly accurately adjust white balance for any density area.

Another object of the present invention is to provide an image sensing apparatus which can automatically perform white-balance adjustment even if it is impossible to manually perform white-balance adjustment while viewing an image.

To achieve the above object, in accordance with a third aspect of the present invention, there is provided an image sensing apparatus including image sensing means for converting subject light into an electrical signal and outputting a plurality of color signals, first light source color detecting means for detecting a color of a source light by means of an external circuit, negative/positive inverting means, mode selecting means for selecting a negative/positive inversion mode, and controlling means for controlling a white-balance adjusting operation of white-balance adjusting means on the basis of a predetermined value if the negative/positive inversion mode is selected by the mode selecting means.

To achieve the above-described object, in accordance with a fourth aspect of the present invention, there is provided an image sensing apparatus which is arranged so that the predetermined value referred to in the above-described aspect can be switched from one value to another according to the kind of negative film.

To achieve the above-described object, in accordance with a fifth aspect of the present invention, there is provided an image sensing apparatus including image sensing means for converting subject light into an electrical signal and outputting a plurality of color signals, second light source color detecting means for detecting a color of source light from an output of the image sensing means, negative/positive inverting means, and mode selecting means for selecting a negative/positive inversion mode, a white-balance adjusting operation of white-balance adjusting means being controlled by means of the second light source color detecting means if the negative/positive inversion mode is selected by the mode selecting means.

To achieve the above object, in accordance with a sixth aspect of the present invention, there is provided an image sensing apparatus which is arranged to correct a predetermined value such as that referred to in the above-described embodiment on the basis of a detection value provided by the second light source color detecting means if a white-balance adjusting operation of the white-balance adjusting means is to be controlled on the basis of the predetermined value.

To achieve the above object, in accordance with a seventh aspect of the present invention, there is provided an image sensing apparatus which is arranged so that predetermined values for white-balance control are switched from one value to another according to the kind of negative film on the basis of a detection value provided by the second light source color detecting means if the negative/positive inversion mode is selected by the mode selecting means referred to in the above-described aspect.

In the image sensing apparatus having the above-described arrangement, the image sensing means converts a subject image into an electrical signal and outputs a plurality of color signals, and the first light source color detecting means detects a color of source light by means of the external circuit. The negative/positive inverting means effects negative/positive inversion, and the mode selecting means selects the negative/positive inversion mode. If the negative/positive inversion mode is selected by the mode selecting means, the white-balance adjusting operation of the white-balance adjusting means is controlled by the control means on the basis of the predetermined value.

The image sensing apparatus according to the fourth aspect of the present invention is arranged to switch the predetermined value referred to in the above-described embodiment from one value to another according to the kind of negative film.

In the image sensing apparatus according to the fifth aspect of the present invention, the image sensing means converts subject light into an electrical signal and outputs a plurality of color signals, and the second light source color detecting means detects a color of a source light from an output of the image sensing means. The negative/positive inverting means effects negative/positive inversion, and the mode selecting means selects the negative/positive inversion mode. If the negative/positive inversion mode is selected by the mode selecting means, a white-balance adjusting operation of the white-balance adjusting means is controlled by means of the second light source color detecting means.

The image sensing apparatus according to the sixth aspect of the present invention is arranged to correct the predetermined value on the basis of a detection value provided by the second light source color detecting means if the white-balance adjusting operation of the white-balance adjusting means is to be controlled on the basis of such a predetermined value.

The image sensing apparatus according to the seventh aspect of the present invention is arranged so that the predetermined values for white-balance control are switched from one value to another according to the kind of negative film on the basis of a detection value provided by the second light source color detecting means if the negative/positive inversion mode is selected by the mode selecting means referred to in the above-described aspect.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 6 is a block diagram showing an image sensing apparatus according to a second embodiment of the present invention;

FIG. 12 is a circuit diagram showing a white-balance control circuit according to the fifth embodiment;

FIG. 13 is a circuit diagram showing a white-balance control circuit according to the sixth embodiment FIG. 14 is a block diagram showing an electronic still camera according to seventh and eighth embodiments of the present invention;

FIG. 16 is a timing chart showing the timing of operation of the seventh embodiment;

FIG. 17 is a detailed view showing an integrating circuit of FIG. 15; and

DETAILED DESCRIPTION OF THE PREFERRED EMBODIMENTS

Preferred embodiments of the present invention will be described below with reference to the accompanying drawings.

Figure 5:
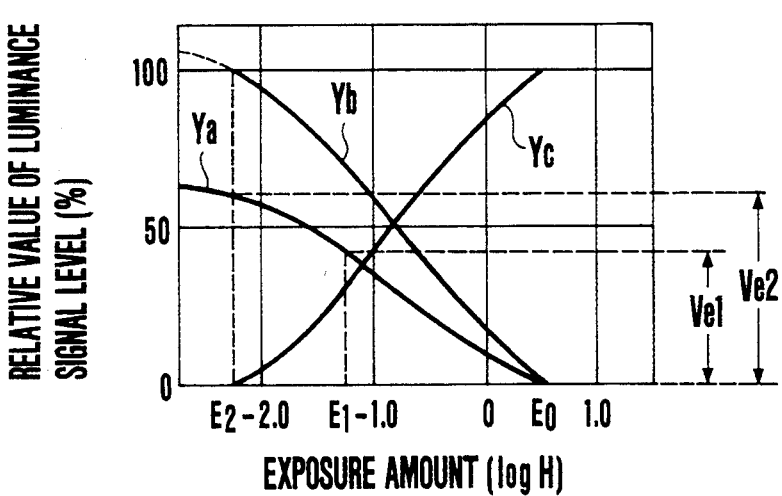
FIG. 5 is a graph showing the relation between an exposure amount given to a film and the relative value of a luminance signal level, and serves to illustrate the first embodiment of the present invention.
Figure 4:
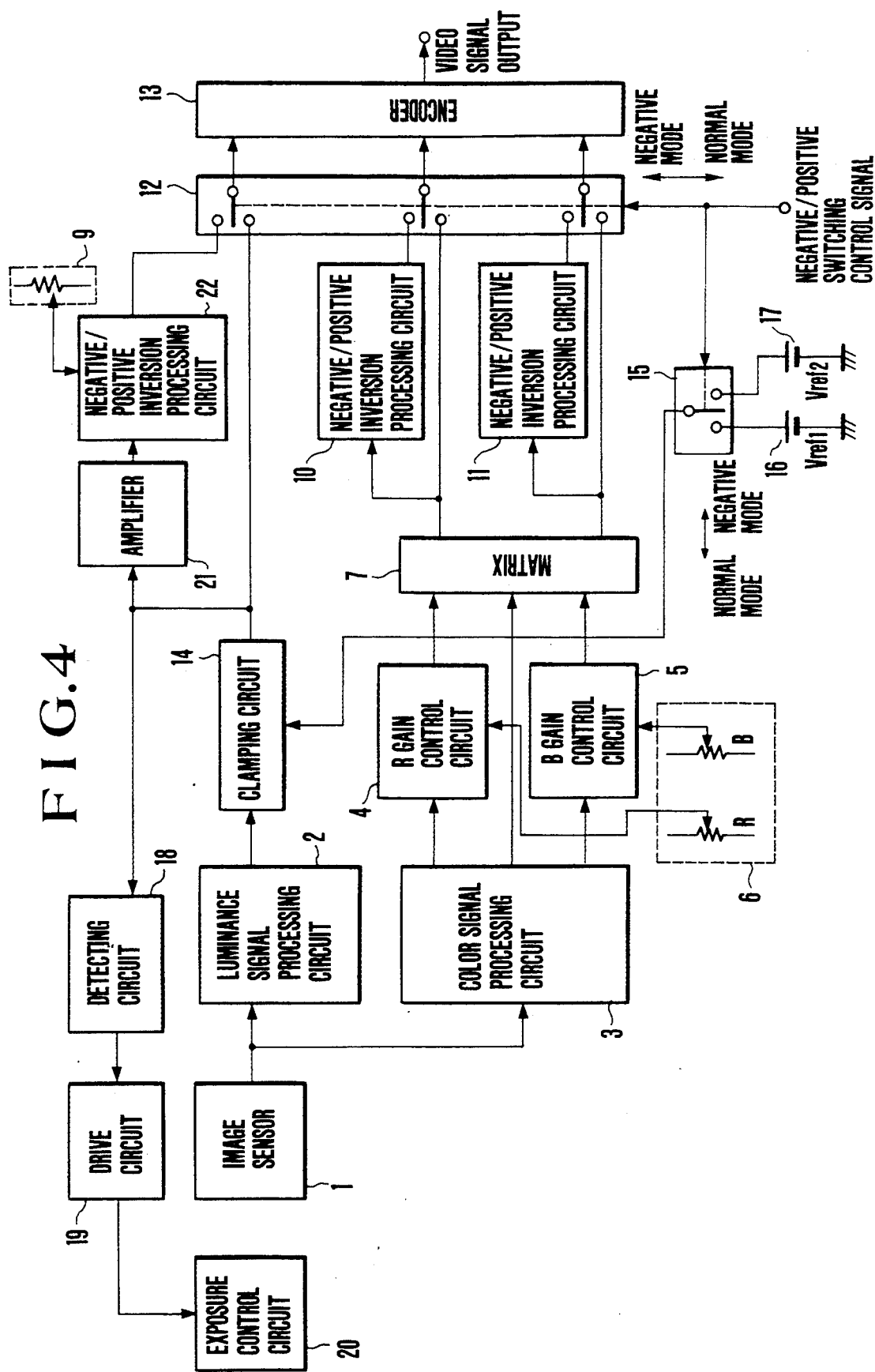
FIG. 4 is a block diagram showing an image sensing apparatus according to a first embodiment of the present invention.

FIG. 4 is a block diagram showing an image sensing apparatus according to a first embodiment of the present invention. FIG. 5 is a graph showing the relation between an exposure amount and the relative value of a luminance signal level, and serves to illustrate the first embodiment of the present invention.

Figure 1:
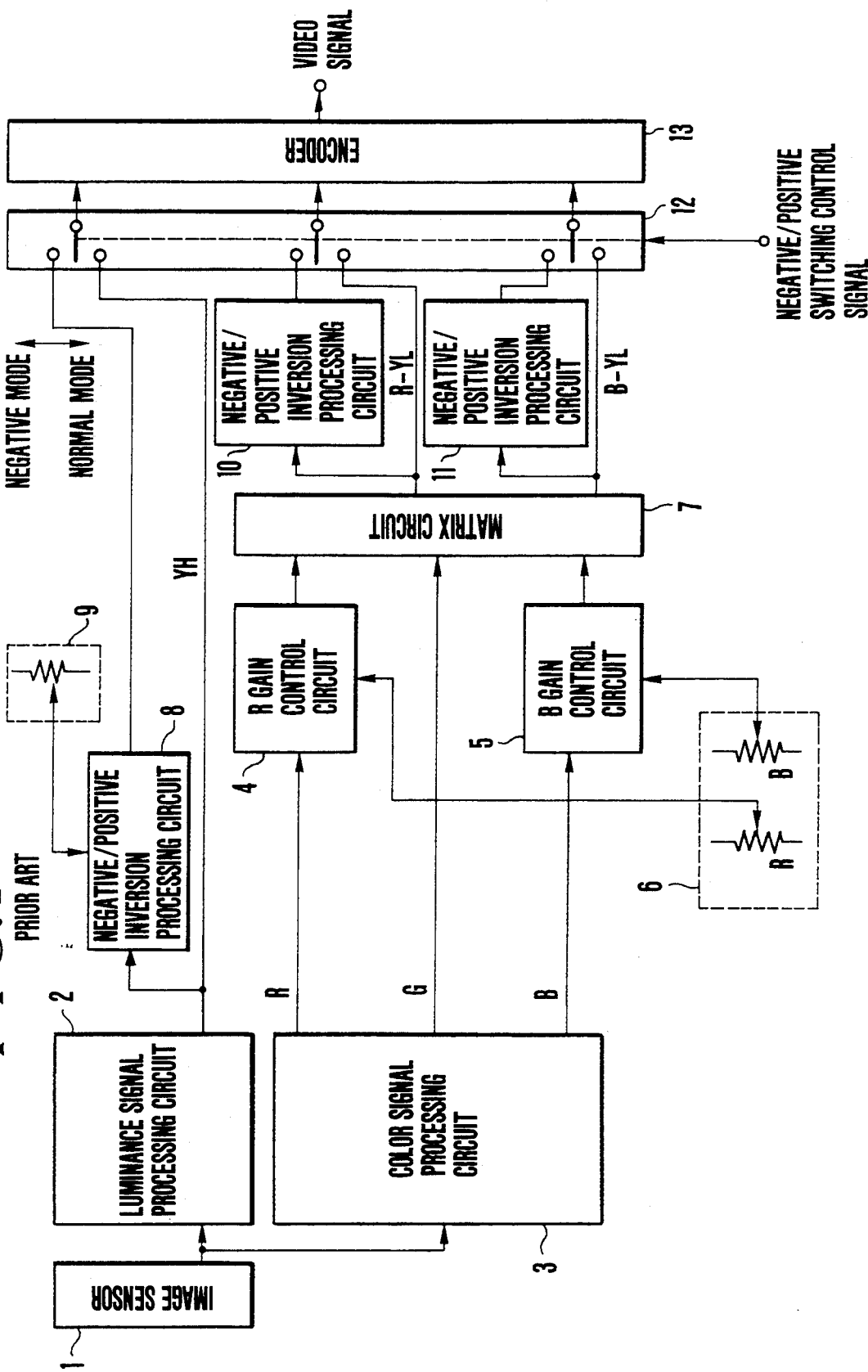
FIG. 1 is a block diagram showing a conventional image sensing apparatus.

In FIG. 4, identical reference numerals are used to denote constituent elements which are identical to or correspond to those shown in FIG. 1, and description is omitted for the sake of simplicity.

In the image sensing apparatus of FIG. 4, a clamping circuit 14 sets the black level of a luminance signal, and a selecting switch 15 switches the clamping potential of the clamping circuit 14 in interlocked relation to a switching circuit 12. The selecting switch 15 performs its switching operation in accordance with a negative/positive switching control signal. Clamping potentials 16 and 17 constitute black-level shifting means. During a normal mode, i.e., during normal photography, a clamping potential $V_{ref1}$ is supplied to the clamping circuit 14, and color signals and a luminance signal bypass negative/positive inversion processing circuits 10, 11 and 22, respectively, and are outputted to an encoder 13. During a negative mode, i.e., during photography made on a negative film, a clamping potential $V_{ref2}$ is supplied to the clamping circuit 14. A detecting circuit 18 includes an average value detecting circuit, a peak value detecting circuit and so on. An exposure control circuit 20 controls exposure by means of a diaphragm or the like and is driven by the output of a drive circuit 19. Reference numerals 21 and 22 denote an amplifier and a negative/positive inversion processing circuit, respectively.

The operation of the above-described image sensing apparatus will be described below.

A clamping potential $V_{ref2}$ which constitutes the black-level shifting means during the negative mode is set as, for example, $V_{ref2} = V_{ref1} - V_{EO}$. Accordingly, the relation between an exposure amount log H given to a film and the relative value of a luminance signal level in the output luminance signal of the clamping circuit 14 is as shown by a curve Ya in FIG. 5.

As can be seen from FIG. 5, the output of the clamping circuit 14 is obtained as a signal level $V_{e2}$ equivalent to a minimum exposure amount $E_2$ of the film, and as a signal level $V_{e1}$ equivalent to an average exposure amount $E_1$ of the film, that is to say, as a difference with respect to a signal level equivalent to the maximum exposure amount $E_0$. The detecting circuit 18 uses the output luminance signal of the clamping circuit 14 to perform average-value detection or peak-value detection. Since the exposure control circuit 20 is driven in accordance with the detection output of the detecting circuit 18, it is possible to achieve optimum exposure control.

For example, as can be seen from the curve Ya in FIG. 5, by causing the detecting circuit 18 to perform the peak-value detection, it is possible to easily execute control to keep constant the signal level $V_{e2}$ equivalent to the minimum exposure amount $E_2$ of the film. In this case, for example, the signal level $V_{e2}$ may be controlled to be always maintained at a level equivalent to 60% in terms of the relative value of the luminance signal level, and the gain of the amplifier 21 may be set so that the signal level $V_{e2}$ can reach 100% as shown by a curve Yb in FIG. 5. In the negative/positive inversion processing circuit 22, as shown by a curve Yc in FIG. 5, the signal level equivalent to the minimum exposure amount $E_2$ is inverted from 100% to 0% and the signal level equivalent to the maximum exposure amount $E_0$ from 0% to 100%, thereby setting a pedestal level.

As is apparent from the foregoing, according to the first embodiment, it is possible to provide accurate exposure control over an image sensor 1 in accordance with the exposure amount of a negative film, whereby it is possible to obtain a luminance signal of correct contrast after negative/positive inversion.

FIG. 6 is a block diagram showing an image sensing apparatus according to a second embodiment of the present invention. In FIG. 6, identical reference numerals are used to denote constituent elements which are identical to or correspond to those used in the conventional example shown in FIG. 1 or those used in the first embodiment shown in FIG. 4, and description is omitted for the sake of simplicity.

In the image sensing apparatus of FIG. 6, a lower-peak-level detecting circuit 23 serves as black-level shifting means and detects the lowest level of a luminance signal obtained by sensing an image on a negative film. A peak holding circuit 24 holds a lower peak level provided by the lower-peak-level detecting circuit 23. A comparing circuit 25 compares the output of the peak holding circuit 24 with the clamping potential $V_{ref1}$.

Figure 3:
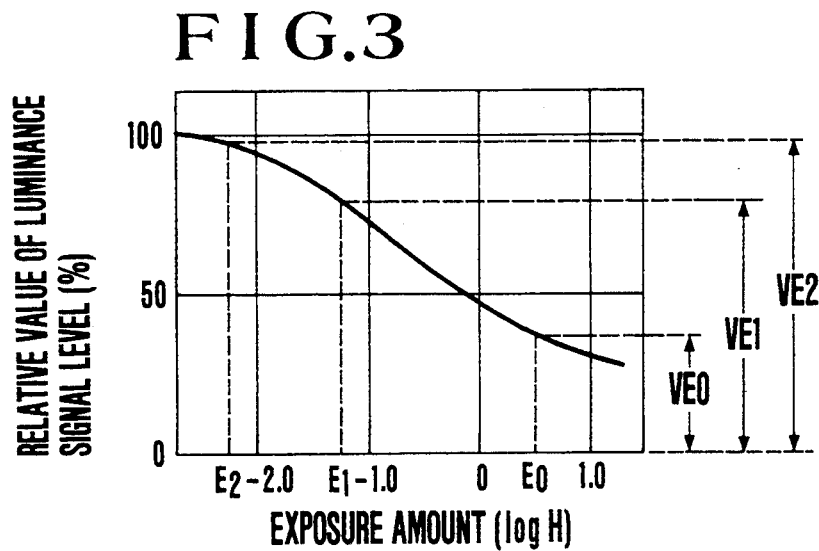
FIG. 3 is a graph showing the relation between an exposure amount given to a film and the relative value of a luminance signal level.

Referring again to FIG. 3, the exposure amount $E_0$ is the maximum exposure amount of a film to be subjected to image sensing. Therefore, the lowest level of a luminance signal provided by a luminance signal processing circuit 2 is $V_{E0}$, and this level is detected by the lower-peak-level detecting circuit 23 and held by the peak holding circuit 24. The comparing circuit 25 compares the held value with the clamping potential $V_{ref1}$ and outputs the resultant difference voltage. The difference voltage is supplied to the clamping circuit 14 to decrease the clamping potential $V_{ref1}$. In consequence, the luminance signal outputted from the clamping circuit 14 is controlled so that its signal level equivalent to the maximum exposure amount $E_0$ is set to 0% as shown by the curve Ya in FIG. 5, whereby it is possible to effect highly accurate detection of luminance signal levels equivalent to the average exposure amount $E_1$ and the minimum exposure amount $E_2$.

As is apparent from the foregoing description, in the second embodiment, since a signal level corresponding to a portion subjected to a maximum exposure is detected and set as a reference level, it is possible to automatically perform optimum exposure control of the image sensor 1.

Although each of the first and second embodiments has been described with reference to the example in which the detecting circuit 18 uses the output of the clamping circuit 14 for the purpose of exposure control, a luminance signal after negative/positive inversion processing may of course be employed. Advantages similar to the above-described ones can also be achieved by using the output video signal of the encoder 13.

Although the description of each of the first and second embodiments refers to exposure control for producing a positive image from a general negative film by inversion, it is also possible to produce a negative image from a positive film by utilizing a negative mode selectable by the switching circuit 12 and the selecting switch 15.

As is apparent from the foregoing description, particularly in the case of photography with the negative mode selected by the selecting switch, by shifting the black level of a luminance signal obtained by sensing a negative image on a negative film, it is possible to provide highly accurate exposure control over the image sensor in accordance with the exposure amount of the negative film.

If the black-level shifting means is arranged in such a manner that clamping potentials which have been set in advance are selectively set by means of the selecting switch for selecting the normal mode or the negative mode, the construction of the apparatus can be simplified.

If the black-level shifting means is arranged in such a manner that the amount of black-level shift is set in accordance with the lower peak level of a luminance signal particularly when the negative mode is selected, it is possible to provide more accurate exposure control.

A third embodiment of the present invention will be described below.

Figure 7:
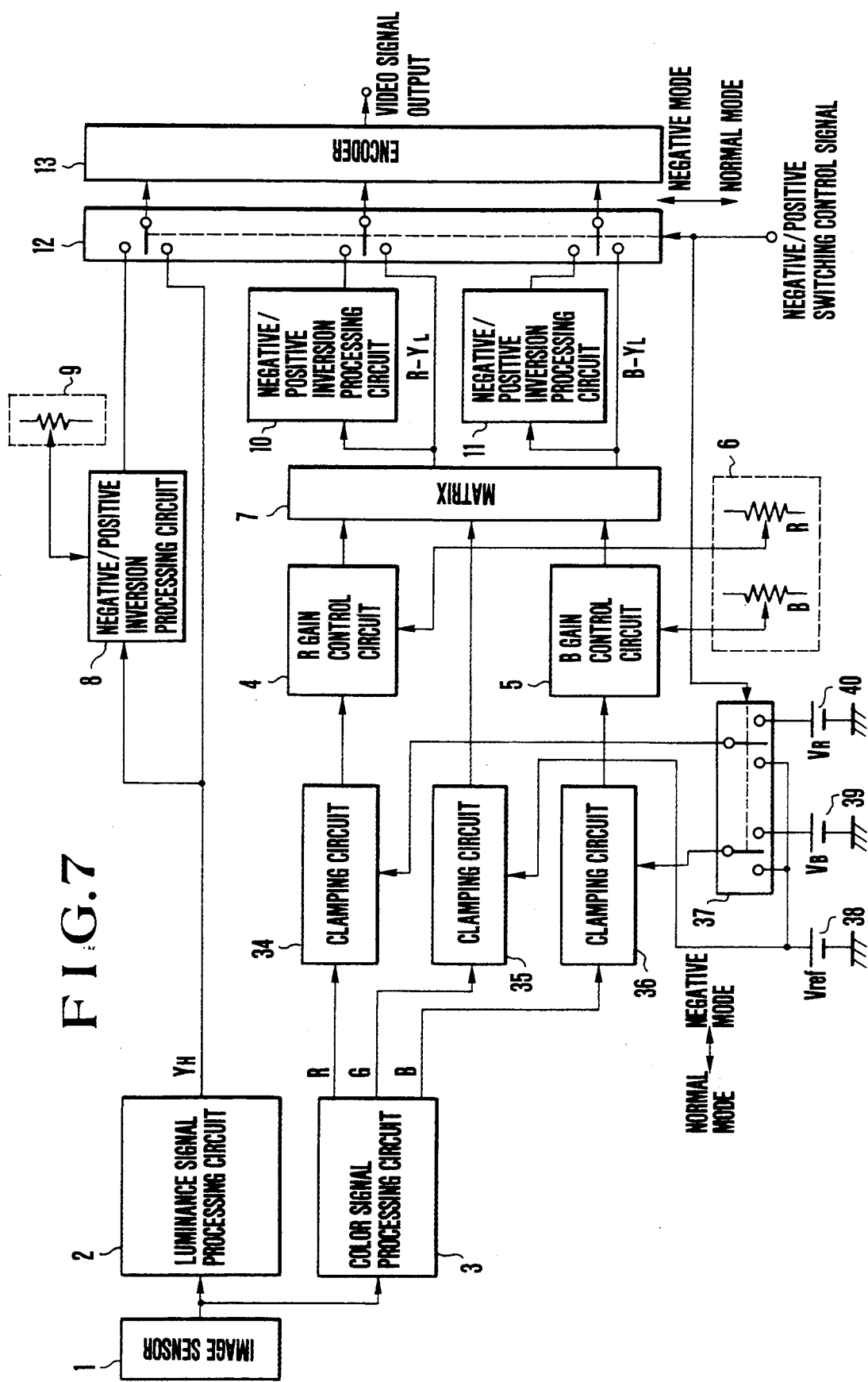
FIG. 7 is a block diagram showing an image sensing apparatus according to a third embodiment of the present invention.
Figure 8:
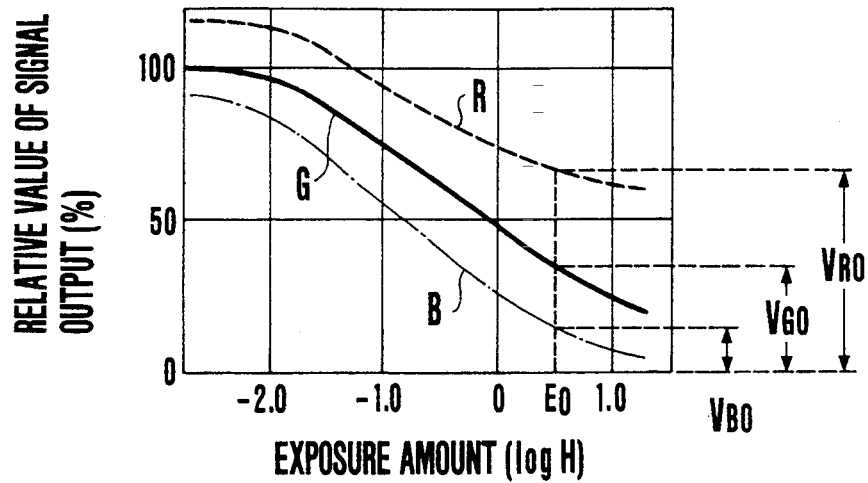
FIGS. 8 and 9 are graphs each showing the relation between an exposure amount and an output signal level, and serves to illustrate the third embodiment of the present invention.
Figure 9:
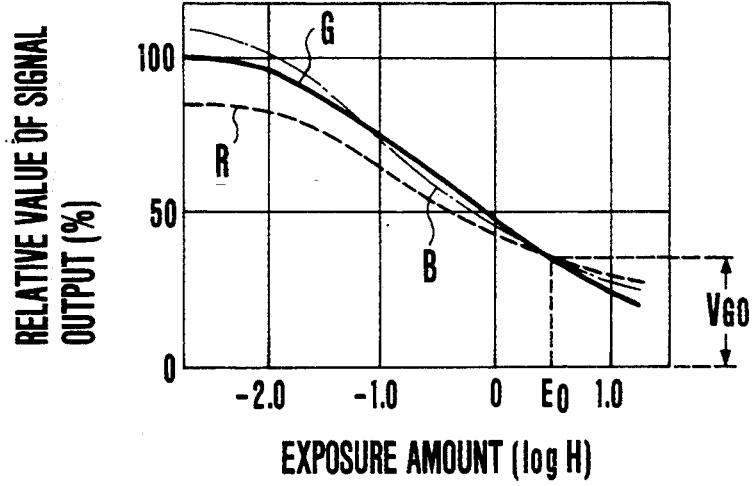

FIG. 7 is a block diagram showing an image sensing apparatus according to the third embodiment of the present invention. FIGS. 8 and 9 are graphs each showing the relation between an exposure amount and an output signal level, and serves to illustrate the third embodiment of the present invention. In FIG. 7, identical reference numerals are used to denote constituent elements which are identical to or correspond to those shown in FIG. 1, and description is omitted for the sake of simplicity.

In the image sensing apparatus of FIG. 7, clamping circuits 34 to 36 set the black levels of RGB signals, respectively. A selecting switch 37 switches the clamping potentials of the respective clamping circuits 34 to 36 in interlocked relation to the switching circuit 12. The switching circuit 12 performs its switching operation in accordance with a negative/positive switching control signal. Clamping potentials 38 to 40 constitute black-level shifting means. During the normal mode, i.e., during normal photography, the same clamping potential ($V_{ref}$) is supplied to the clamping circuits 34 to 36, and color signals and a luminance signal bypass the negative/positive inversion processing circuits 8, 10 and 11, respectively, and are outputted to the encoder 13. During the negative mode, i.e., during photography made on a negative film, a clamping potential $V_R$ is supplied to the clamping circuit 34 while a clamping potential $V_B$ is supplied to the clamping circuit 36.

The operation of the above-described image sensing apparatus will be described below.

Figure 2:
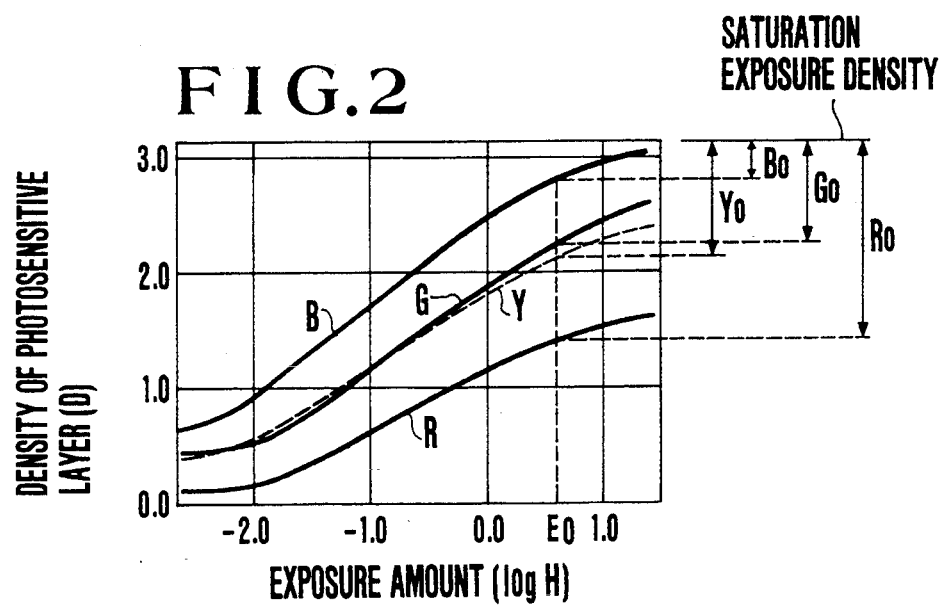
FIG. 2 is a graph showing the relation between an exposure amount given to a negative film and the density thereof.

FIGS. 8 and 9 are graphs each showing the relations between the exposure amount log H and the relative values (100%: the signal level of G of a film base) of RGB color signal outputs which are respectively obtained from the outputs of the clamping circuits 34 to 36 when a negative film of characteristic shown in FIG. 2 is subjected to image sensing. FIG. 8 shows the case of the normal mode while FIG. 9 shows the case of the negative mode. During the normal mode, the clamping potentials for R, G and B are $V_{ref}$. Accordingly, during the normal mode, if a sensed image on the negative film is subjected to signal processing to produce a positive image, the output signal levels of the respective RGB colors exhibit characteristics proportional to film density as shown in FIG. 8. For example, the output signal levels equivalent to a certain exposure amount $E_0$ are $V_{R0}$, $V_{G0}$ and $V_{B0}$, so that an extremely large deviation occurs in white balance.

In the third embodiment of the present invention, however, when the negative mode is selected, $V_R$ is supplied as a clamping voltage for an R signal, while $V_B$ is supplied as a clamping voltage for a B signal. If these $V_R$ and $V_B$ are set to:

$$V_R = V_{ref} + (V_{G0} - V_{R0}), V_B = V_{ref} + (V_{G0} - V_{B0})$$

the black levels of the R and B signals are shifted by $(V_{G0} - V_{R0})$ and $(V_{G0} - V_{B0})$, respectively. Accordingly, as shown in FIG. 9, when the exposure amount $E_0$ is reached, the respective output signal levels are equal to one another so that no deviation occurs in white balance.

Gain control circuits 4 and 5 effect gain adjustment in accordance with a white-balance control potentiometer part 6 so as to reduce deviation in the white balance of a portion which shows a small exposure amount, that is, a high signal level. Accordingly, it is possible to minimize the deviation in white balance over the entire range of signal levels.

Figure 10:
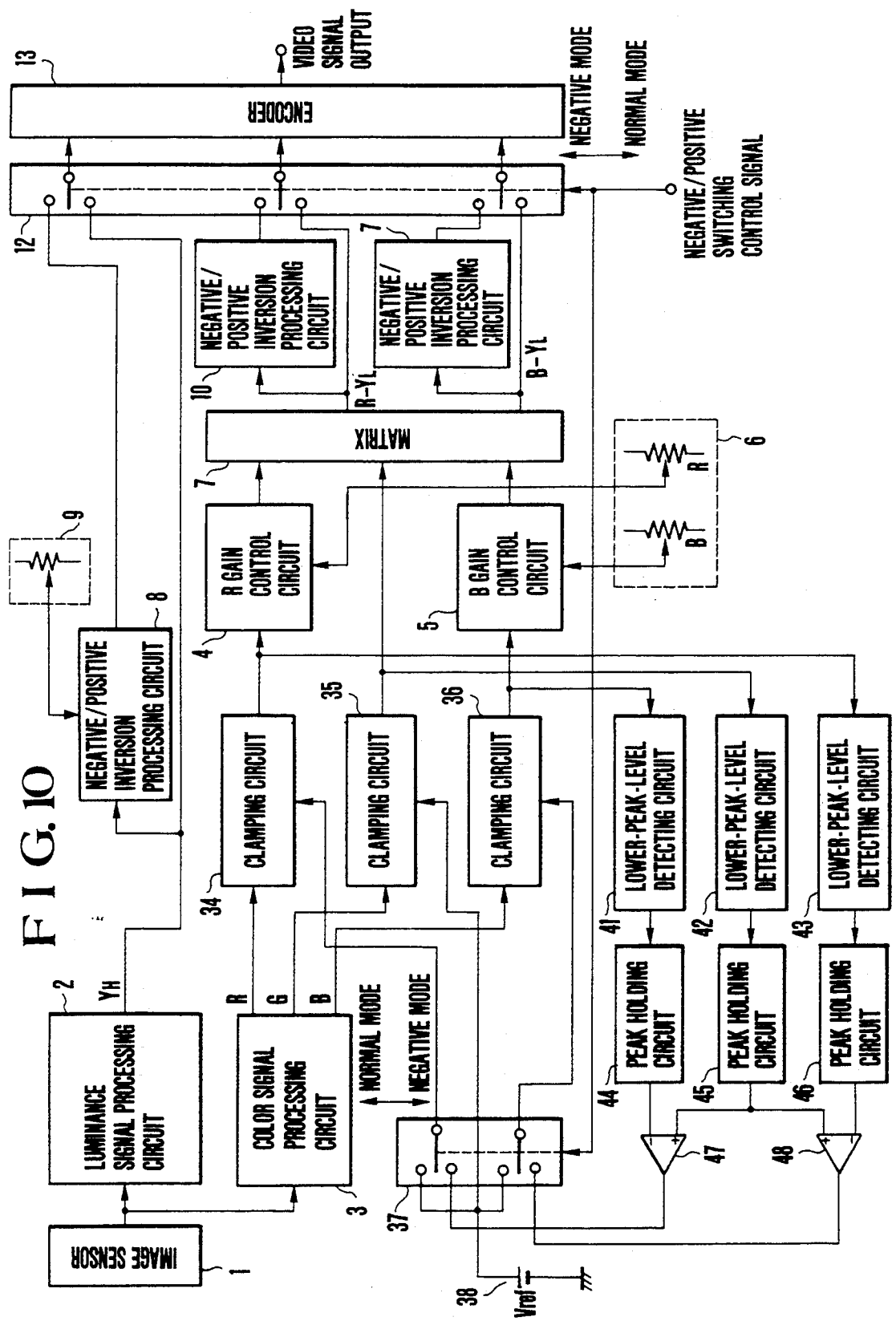
FIG. 10 is a block diagram showing an image sensing apparatus according to a fourth embodiment of the present invention.

FIG. 10 is a block diagram showing an image sensing apparatus according to a fourth embodiment of the present invention. In FIG. 10, identical reference numerals are used to denote constituent elements which are identical to or correspond to those of the conventional example shown in FIG. 1 or those of the third embodiment shown in FIG. 7, and description is omitted for the sake of simplicity.

In the image sensing apparatus of FIG. 10, lower-peak-level detecting circuits 41 to 43 are provided as black-level shifting means, and detect the lowest levels of individual RGB signals obtained by sensing an image on a negative film. Peak holding circuits 44 to 46 hold lower peak levels provided by the lower-peak-level detecting circuits 41 to 43. A comparing circuit 47 compares the output of the peak holding circuit 44 with the output of the peak holding circuit 45, while a comparing circuit 48 compares the output of the peak holding circuit 45 with the output of the peak holding circuit 46.

For example, if the exposure amount $E_0$ of FIG. 8 is the maximum exposure amount of a negative film to be subjected to image sensing, the lowest levels of the respective RGB signals provided by a color signal processing circuit 3 is $V_{R0}$, $V_{G0}$ and $V_{B0}$, and these levels are detected by the lower-peak-level detecting circuits 41 to 43 and held by the peak holding circuits 44 to 46. The comparing circuit 47 compares the value held by the peak holding circuit 44 with the value held by the peak holding circuit 45, while the comparing circuit 48 compares the value held by the peak holding circuit 45 with the value held by the peak holding circuit 46. The comparing circuits 47 and 48 generate level changes equivalent to $V_{G0} - V_{R0}$ and $V_{G0} - V_{B0}$, respectively, thereby decreasing a clamping potential for the R signal and increasing a clamping potential for the B signal. In the above-described manner, the signal levels of the RGB signals equivalent to the maximum exposure amount $E_0$ are all set to $V_{G0}$, as shown in FIG. 9.

As described above, in the fourth embodiment, the respective signal levels equivalent to the maximum exposure amount $E_0$ are detected and adjusted to reach an equal level, whereby a deviation in white balance is automatically minimized.

Although the description of the fourth embodiment refers to white-balance adjustment which is performed when a positive image is to be produced from a general negative film by inversion, it is also possible to produce a negative image from a positive film by utilizing a negative mode selectable by the switching circuit 12 and the selecting switch 37.

As is apparent from the foregoing description, in a case where color signals obtained by sensing an image on a negative film or the like are subjected to inversion processing, the black levels of the respective color signals can be shifted to highly accurately adjust the white balance of a plurality of color signals for any density region of the negative film.

If the black-level shifting means is arranged in such a manner that clamping potentials which have been set in advance are switched from one value to another by means of the selecting switch, the construction of the apparatus can be simplified.

If the black-level shifting means is arranged in such a manner that particularly at the time of color inversion, the lowest peak levels of a plurality of color signals are detected and the amounts of black-level shifts are set in accordance with the detection outputs, it is possible to automatically adjust white balance with high precision.

Fifth to eighth embodiments will be described below with reference to FIGS. 11 to 18.

Figure 11:
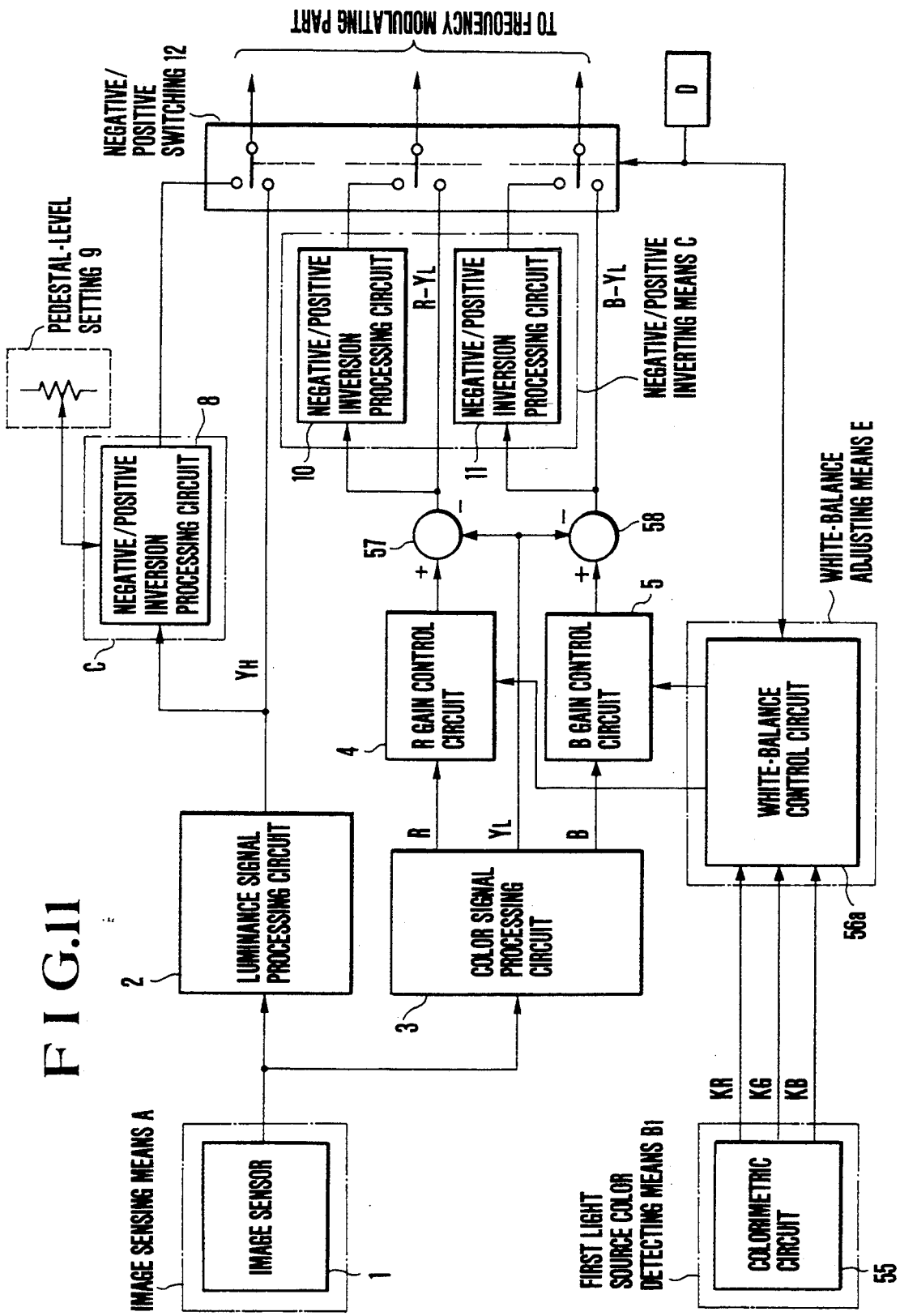
FIG. 11 is a block diagram showing an electronic still camera according to fifth and sixth embodiments of the present invention.
Figure 15:
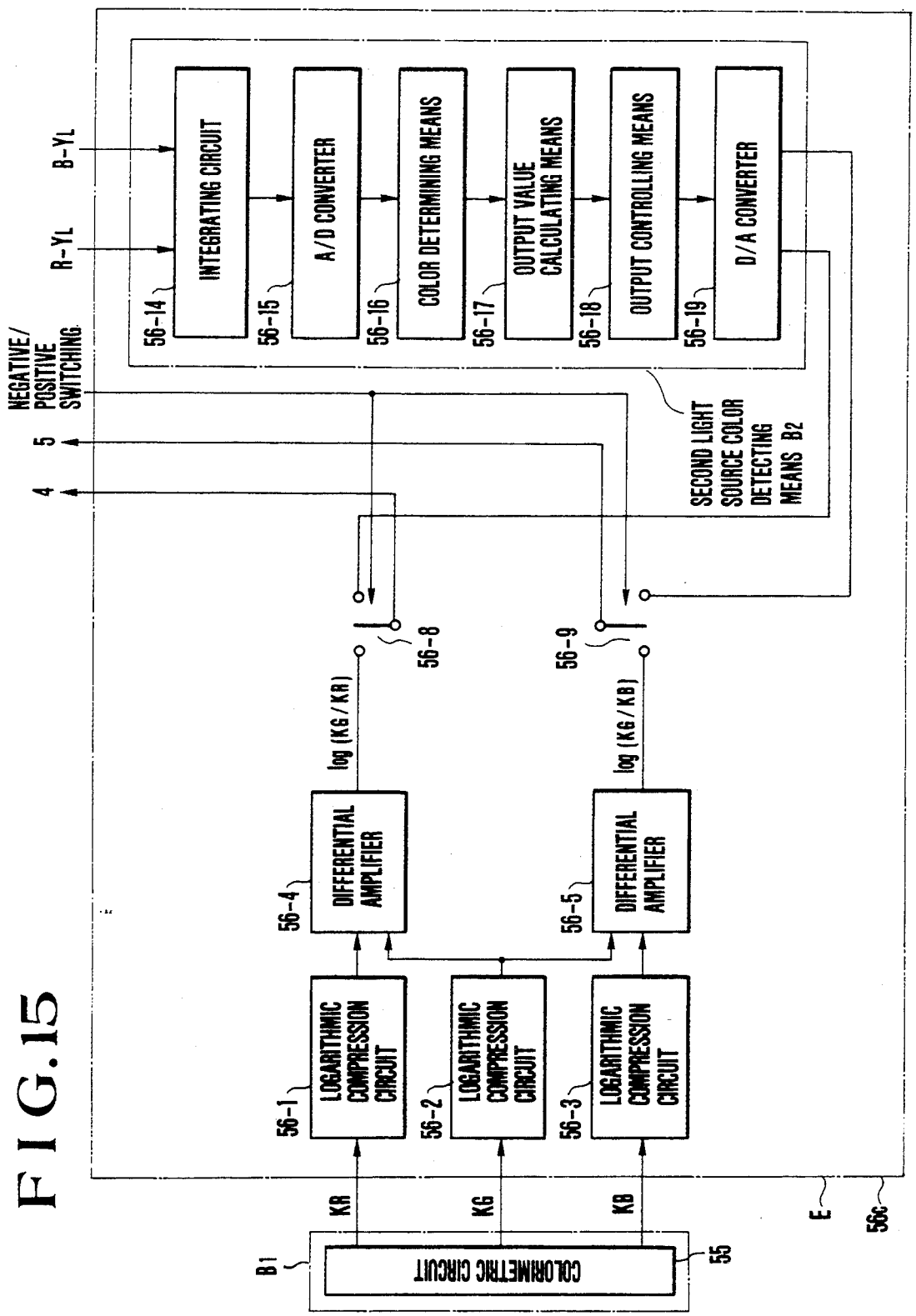
FIG. 15 is a circuit diagram showing a white-balance control circuit according to the seventh embodiment.
Figure 18:
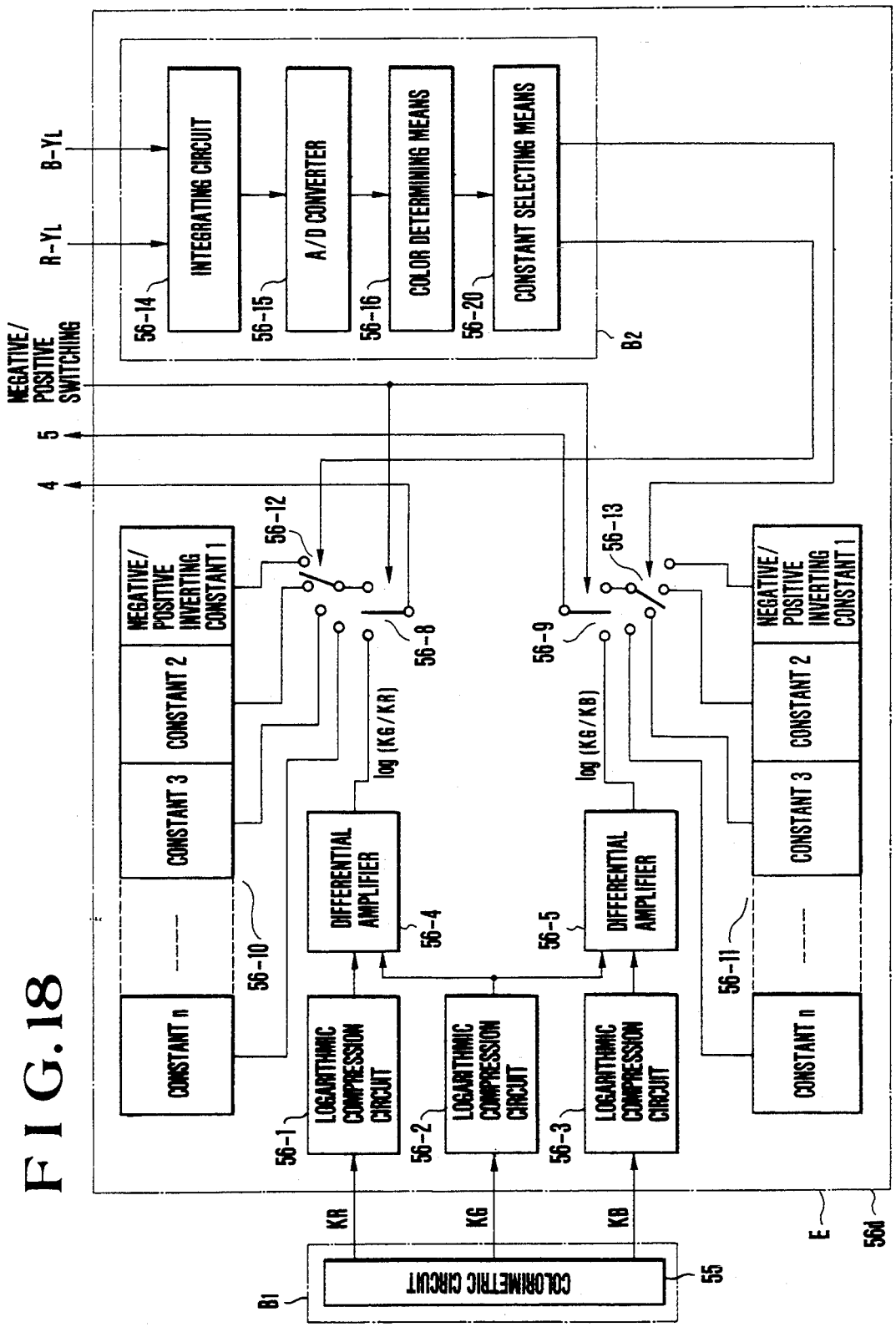
FIG. 18 is a circuit diagram showing a white-balance control circuit according to the eighth embodiment.

FIG. 11 is a block diagram showing the construction of an electronic still camera according to the fifth and sixth embodiments of the present invention. FIG. 12 is a circuit diagram showing a white-balance control circuit according to the fifth embodiment. FIG. 13 is a circuit diagram showing a white-balance control circuit according to the sixth embodiment. FIG. 14 is a block diagram showing the construction of an electronic still camera according to the seventh and eighth embodiments of the present invention. FIG. 15 is a circuit diagram showing a white-balance control circuit according to the seventh embodiment. FIG. 16 is a timing chart showing the timing of operation of the seventh embodiment. FIG. 17 is a detailed view showing an integrating circuit of FIG. 15. FIG. 18 is a circuit diagram showing a white-balance control circuit according to the eighth embodiment.

In each of FIGS. 11 to 18, identical reference numerals are used to denote constituent elements which are identical to or correspond to those used in the conventional example described previously, and description is omitted for the sake of simplicity.

An electronic still camera according to the fifth embodiment of the present invention will be described below with reference to FIGS. 11 and 12.

In the fifth embodiment, during a negative/positive inversion mode, control of white balance is performed by using negative/positive inverting constants (predetermined values) which have been set in advance.

Referring to FIG. 11, image sensing means A includes the image sensor 1 and serves as means for converting subject light into an electrical signal and outputting a plurality of color signals.

First light source color detecting means $B_1$ includes a colorimetric circuit 55 (to be described later in detail) and serves as means for detecting the color of source light by means of an external circuit (in this embodiment, the colorimetric circuit 55). Negative/positive inverting means C includes the negative/positive inversion processing circuits 8, while another negative/positive inverting means C includes the negative/positive inversion processing circuits 10 and 11, as will be described in detail later.

Mode selecting means D is provided for selecting the negative/positive inversion mode.

White-balance adjusting means E includes a white-balance control circuit 56a (to be described in detail later).

The colorimetric circuit 55 serving as the first light source color detecting means $B_1$ and the white-balance control circuit 56a serving as the white-balance adjusting means E will be described below with reference to FIG. 12. In FIG. 12, during normal photography, outputs KR, KG and KB from R, G and B sensors disposed in the colorimetric circuit (sensor) 55 are respectively inputted to logarithmic compression circuits 56-1, 56-2 and 56-3 included in the white-balance control circuit 56a. The logarithmic compression circuits 56-1, 56-2 and 56-3 subject the respective signals KR, KG and KB to logarithmic conversion so as to effectively utilize a dynamic range and to facilitate execution of later processing. Outputs log KR and log KG from the respective logarithmic compression circuits 56-1 and 56-2 are inputted to a differential amplifier 56-4, while outputs log KB and log KG from the respective logarithmic compression circuits 56-2 and 56-3 are inputted to a differential amplifier 56-5. The differential amplifiers 56-4 and 56-5 provide differential outputs log (KG/KR) and log (KG/KB), respectively. During the normal mode, the differential outputs log (KG/KR) and log (KG/KB) are sent to the gain control circuits 4 and 5 (shown in FIG. 11) via switches 56-8 and 56-9, respectively, and white balance is adjusted.

In the case of the negative/positive inversion mode, the switches 56-8 and 56-9 are connected to sides which are coupled to negative/positive inverting constants 56-6 and 56-7, respectively, in accordance with a negative/positive switching control signal from the mode selecting means D. A white-balance control signal for negative/positive inversion, which has been set in advance, is sent to each of the gain control circuits 4 and 5 so that adjustment of white balance is performed. In the above-described manner, it is possible to achieve accurate adjustment of white balance during the negative/positive inversion mode even in an electronic still camera having no electronic viewfinder. In addition, even in the case of a video camera of the external metering type, correct adjustment of white balance can be achieved.

The sixth embodiment of the present invention will be described below with reference to FIGS. 11 and 13.

In the sixth embodiment, during the negative/positive inversion mode, control of white balance is performed by switching a plurality of preset fixed values from one value to another in accordance with the kind of negative film. Alternatively, instead of the switching of control values for white balance, a filter for cancelling the difference in color between negative films may be inserted between the negative film and the image sensor.

In FIG. 13, reference numeral 56b denotes a modification of the white-balance control circuit 56a of FIG. 11. In FIG. 13, identical reference numerals are used to denote constituent elements which are identical in function to those shown in FIG. 12, and description is omitted for the sake of simplicity.

Referring to FIG. 13, during the negative/positive inversion mode, the switches 56-8 and 56-9 are connected to sides coupled to groups 56-10 and 56-11 of negative/positive inverting constants, respectively, in accordance with a negative/positive switching control signal from the mode selecting means D.

In addition, switches 56-12 and 56-13 are switched in accordance with a switching control signal for selecting the kind of film, and a constant conforming to the kind of film is selected from each of the constant groups 56-10 and 56-11 for white-balance control during the negative/positive inversion mode. The selected constants are supplied to the gain control circuits 4 and 5, respectively, so that adjustment of white balance is performed. By performing adjustment of white balance in the above-described manner, it is possible to achieve effects and advantages which are similar to those of the fifth embodiment, and it is also possible to solve the problem that a deviation may occur in white balance due to the difference in kind between films. Although not shown, to achieve an automatic decision as to the kind of film, it is desirable that a mark or the like indicative of the kind of film be formed on a film and that a sensor for reading out and determining the mark or the like be provided in the image sensing apparatus. Needless to say, the selection from each of the constant groups for white-balance control may also be performed by a manual operation.

Instead of the method of selecting a desired constant from each of the constant groups for white-balance control, a filter for cancelling the difference in color between negative films may be inserted between the negative film and the image sensor and control of white balance may be performed by using a fixed value, as in the case of the fifth embodiment described above. In this case as well, it is possible to achieve similar effects and advantages.

The seventh embodiment of the present invention will be described below with reference to FIGS. 14 to 17.

In the seventh embodiment, during the normal photography, white-balance adjustment utilizing an external metering method is carried out, while, during the negative/positive inversion mode, white-balance adjustment is performed by second light source color detecting means $B_2$ for detecting the color of a light source from the output of the image sensor.

FIG. 14 is a block diagram showing the arrangement of each of the seventh and eighth embodiments, and FIG. 15 is a block diagram showing an example of the arrangement of the white-balance control circuit 56c of FIG. 14. In FIGS. 14 and 15, identical reference numerals are used to denote constituent elements which are identical in function to those shown in FIGS. 11 and 12.

FIG. 16 shows the timing of white-balance control carried out in an electronic still camera according to the seventh embodiment, and FIG. 17 is a detailed block diagram showing the integrating circuit 56-14 shown in FIG. 15.

As shown, the seventh embodiment includes, in addition to the major elements described previously, a shutter SH, a system control circuit SC including a microcomputer, an integrating circuit IT, a frequency modulating part FM, a recording apparatus REC, the white-balance control circuit 56c, the integrating circuit 56-14, an A/D converter 56-15, color determining means 56-16, output value calculating means 56-17, output controlling means 56-18, a D/A converter 56-19, the second light source color detecting means $B_2$, operational amplifiers 56-141 and 56-144, capacitors 56-142 and 56-145, switches 56-143 and 56-146, and a reference voltage source $V_{ref}$.

The operation of the seventh embodiment will be described below with reference to FIGS. 15 and 16, with the second light source color detecting means $B_2$ as a main subject.

As shown in FIG. 16, in the electronic still camera according to the seventh embodiment, to obtain the signal required to perform white-balance control from the image sensor before actually forming a still image video signal to be recorded on a recording medium such as a magnetic disk, the image sensor 1 is cleared between $t_0$ and $t_1$ in FIG. 16, and between $t_1$ and $t_2$ the shutter SH is opened to store electric charge in the image sensor 1 (this process is hereinafter referred to as "pre-exposure").

At $t_3$, the switches 56-143 and 56-146 shown in FIG. 17 are turned on to reset the integrating circuit 56-14, 14, and a value which is sampled by a sampling pulse at $t_4$ is subjected to A/D conversion by the A/D converter 56-15 (FIG. 15) and read into the color determining means 56-16 as an integral output of "0" level.

Then, the electric charge stored in the image sensor 1 is read out between $t_5$ and $t_6$. During this time, the integrating circuit 56-14 (FIG. 15) performs integration of color-difference signals. After the completion of the readout, a value which is sampled at $t_7$ is subjected to A/D conversion and read into the color determining means 56-16, which memorizes the difference between the value read at $t_4$ and the value read at $t_7$ as an integral value. In the meantime, between $t_5$ and $t_6$, the integrating circuit IT integrates a luminance signal and inputs the resultant integral value into the system control circuit SC.

The color determining means 56-16 (FIG. 15) makes a color decision on the basis of the integral value of the aforesaid difference, and the output value calculating means 56-17 calculates the value of a white-balance control signal on the basis of the result of the color decision. The calculation result is supplied to the D/A converter 56-19 (FIG. 15) via the output controlling means 56-18, and the D/A converter 56-19 converts the calculation result into a dc voltage to form a white-balance control signal. Then, the image sensor 1 is cleared between $t_9$ and $t_{10}$, and main exposure for the exposure amount based on the output of the integrating circuit IT is performed between $t_{10}$ and $t_{11}$. Subsequently, readout from the image sensor 1 is performed between $t_{12}$ and $t_{13}$, and during this time a gate circuit in the recording unit REC is opened to record the read-out contents.

In the seventh embodiment, during the normal photography, white-balance adjustment utilizing an external metering method is carried out as in the case of each of the fifth and sixth embodiments. During the negative/positive inversion mode, the switches 56-8 and 56-9 shown in FIG. 15 are respectively switched to sides coupled to the D/A converter 56-19 to perform white-balance adjustment in accordance with the above-described white-balance control signal formed by using the output of the image sensor 1. Accordingly, even in the case of an electronic still camera having no electronic viewfinder or an external metering type of white-balance circuit, it is possible to achieve correct adjustment of white balance.

In addition, it is not necessary to manually switch the control values for white balance from one value to another in accordance with the kind of film.

Color information on a subject recorded on a negative film is compressed on the basis of the color and gamma characteristics of the base of the negative film. Accordingly, since the subject image is not greatly influenced even if the integral values of color-difference signals are used for a color decision, it is possible to achieve a simple and highly accurate control method for negative/positive inversion as compared to a normal TTL type of white-balance control.

In the above description, the color-difference signals which have been read out after the pre-exposure are integrated for one field and used as information for the color decision. However, the peak portion on a picture of a read-out luminance signal may be regarded as a light source and color-difference signals corresponding to such peak portion may be sampled and used as information for the color decision. Otherwise, information obtainable by these two methods may be used in combination.

The eighth embodiment of the present invention will be described below with reference to FIG. 18.

In the eighth embodiment, during the negative/positive inversion mode, as in the case of the fifth embodiment, a predetermined value is set and correction for the value is performed on the basis of the result of colorimetry performed by the second light source color detecting means $B_2$. Alternatively, as in the case of the sixth embodiment, a plurality of predetermined values are set and selection from among such predetermined values (for example, the kinds of negative film) is performed on the basis of the result of colorimetry performed by the second light source color detecting means $B_2$.

FIG. 18 is a block diagram showing a white-balance control circuit according to the eighth embodiment.

Referring to FIG. 18, during the negative/positive inversion mode, the switches 56-8 and 56-9 are respectively connected to sides coupled to the groups 56-10 and 56-11 of negative/positive inverting constants in accordance with a negative/positive switching control signal, and the color determining means 56-16 similar to that used in the seventh embodiment performs a color decision. On the basis of information indicative of the color decision, constant selecting means 56-20 determines which constant should be selected from a plurality of constants (constant 1, ..., constant n) which have been set in advance, for example, the kinds of negative film. The switches 56-12 and 56-13 are switched in accordance with the decision made by the constant selecting means 56-20, thereby performing adjustment of white balance. In the above-described manner, it is possible to achieve effects and advantages similar to those of each of the above-described embodiments.

If constants for white-balance adjustment are fixed as in the fifth embodiment and correction for the values of the constants is performed on the basis of the colorimetric result obtained by a TTL metering method, it is possible to achieve effects and advantages similar to those of each of the above-described embodiments.

In either case, if the constants for white-balance adjustment utilizing colorimetry based on the TTL metering method are set so as to cancel the color of the base of a negative film, highly accurate colorimetry can be achieved. Although the above embodiments have been described with illustrative reference to the still video camera, they can be applied to a movie video camera.

As described above, in the image sensing apparatus according to the fifth to eighth embodiments, predetermined values which have been set in advance are utilized as means for effecting white-balance adjustment during the negative/positive inversion mode.

In such an image sensing apparatus, for example, a plurality of predetermined values are switched from one value to another in accordance with the kind of film, or a TTL metering method is selected by switching, or correction for a predetermined value is performed on the basis of the result obtained by external metering utilizing the TTL metering method, or selection from a plurality of predetermined values is performed. Accordingly, it is possible to achieve automated accurate adjustment of white balance and to prevent a deviation from occurring in white balance.

What is claimed is:

1. An image sensing apparatus comprising:
   image sensing means;
   clamp means for clamping a predetermined portion of an output of said image sensing means to a predetermined reference level;
   inverting means for selectively inverting a polarity of an output of said clamp means; and
   varying means for varying said reference level of said clamp means in accordance with an operation of said inverting means.

2. An image sensing apparatus according to claim 1, wherein said clamping means includes a clamping circuit.

3. An image sensing apparatus according to claim 2, wherein said clamping circuit includes a first clamping power source for supplying a first clamping potential and a second clamping power source for supplying a second clamping potential.

4. An image sensing apparatus according to claim 1, wherein said inverting means includes a first inverting circuit for inverting a polarity of a luminance signal and second and third inverting circuits for inverting polarities of R-Y and B-Y signals, respectively.

5. An image sensing apparatus according to claim 1, wherein said image sensing means includes a charge-coupled device.

6. An image sensing apparatus according to claim 1, further comprising exposure controlling means for controlling an exposure amount of said image sensing means, said exposure controlling means being controlled in accordance with an output of said clamp means.

7. An image sensing apparatus comprising:
   color image sensing means for correcting an optical image into an electrical signal and generating a plurality of color signals;
   clamp means for clamping a predetermined portion of an output of said image sensing means to a predetermined reference level;
   inversion processing means for selectively inverting said plurality of color signals; and
   level changing means for changing said reference level of said clamp means in accordance with an operation of said inversion processing means.

8. An image sensing apparatus according to claim 7, wherein said clamp means includes a clamping circuit.

9. An image sensing apparatus according to claim 8, wherein said clamping circuit includes a first clamping power source for supplying a first clamping potential and a second clamping power source for supplying a second clamping potential.

10. An image sensing apparatus according to claim 7, wherein said inversion processing means includes a first inverting circuit for inverting a polarity of a luminance signal and second and third inverting circuits for inverting polarities of R-Y and B-Y signals, respectively.

11. An image sensing apparatus according to claim 7, wherein said color image sensing means includes a charge-coupled device.

12. An image sensing apparatus according to claim 8, wherein said clamping circuit includes a feedback clamping circuit.

13. An image sensing apparatus according to claim 7, further comprising exposure controlling means for controlling an exposure amount of said color image sensing means, said exposure controlling means being controlled in accordance with an output of said level changing means.

14. An image sensing apparatus comprising:
   image sensing means for converting subject light into an electrical signal and outputting a plurality of color signals;
   white balance control means for automatically controlling a white-balance condition of said color signals based on an output of a color temperature detecting means;
   negative/positive inverting means;
   mode selecting means for selecting a negative/positive inversion mode; and
   fixing means for fixing the white-balance condition regardless of said white-balance control means when the negative/positive inversion mode is selected.

15. An image sensing apparatus according to claim 14, wherein said fixing means fixes the white-balance condition to a respective different condition in accordance with the kind of negative film.

16. An image sensing apparatus comprising:
   image sensing means;
   level control means for setting a predetermined portion of an output of said image sensing means to a predetermined reference level;
   inverting means for selectively inverting a polarity of an output of said level control means; and
   varying means for varying said reference level of said level control means in accordance with an operation of said inverting means.

17. An image sensing apparatus according to claim 16, wherein said level control means includes clamping means.

18. An image sensing apparatus according to claim 17, wherein said clamping means includes a first clamping power source for supplying a first clamping potential and a second clamping power source for supplying a second clamping potential.

19. An image sensing apparatus according to claim 16, wherein said inverting means includes a first inverting circuit for inverting a polarity of a luminance signal and second and third inverting circuits for inverting polarities of R-Y and B-Y signals, respectively.

20. An image sensing apparatus according to claim 16, wherein said image sensing means includes a charge-coupled device.

21. An image sensing apparatus according to claim 16, further comprising exposure controlling means for controlling an exposure amount of said image sensing means, said exposure controlling means being controlled in accordance with an output of said level control means.

22. An image sensing apparatus according to claim 16, wherein said image sensing means includes color sensor.

* * * * *

UNITED STATES PATENT AND TRADEMARK OFFICE
CERTIFICATE OF CORRECTION

PATENT NO. : 5,424,774
DATED : June 13, 1995
INVENTOR(S) : Tsutomu Takayama et al.

It is certified that error appears in the above-indentified patent and that said Letters Patent is hereby corrected as shown below:

Col. 2, line 10. After "level" insert -- $V_{E1}$ --.

Col. 5, line 61. After "embodiment" insert -- ; --.

Col. 8, line 56. Change "$V_B$" to -- $V_R$ --.

Signed and Sealed this

Tenth Day of October, 1995

Attest:

BRUCE LEHMAN

Attesting Officer

Commissioner of Patents and Trademarks